Figure 1:
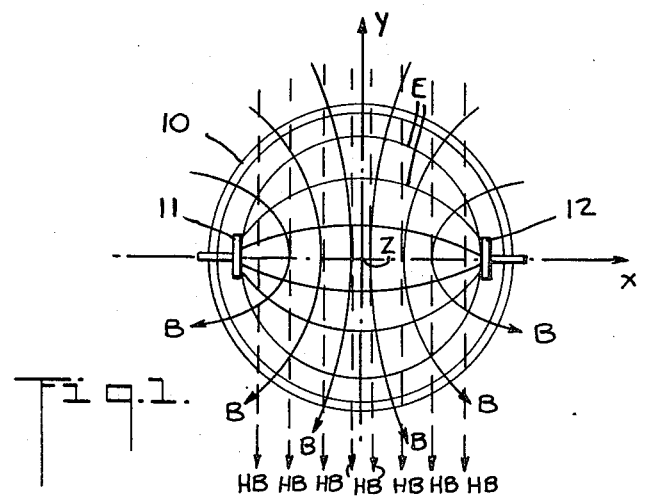

United States Patent

Kiene

[15] 3,688,575
[45] Sept. 5, 1972

[54] MAGNETIC FLOWMETER HAVING A NON-HOMOGENEOUS MAGNETIC FIELD

[72] Inventor: Wilfried Kiene, Hedemunden, Germany

[73] Assignee: Fischer & Porter Company, Warminster, Pa.

[22] Filed: Dec. 21, 1970

[21] Appl. No.: 100,160

[30] Foreign Application Priority Data

Feb. 21, 1970 Germany..........P 20 08 044.8

[52] U.S. Cl............................................73/194 EM
[51] Int. Cl..............................G01f 1/00, G01p 5/08
[58] Field of Search.................................73/194 EM

[56] References Cited

UNITED STATES PATENTS

| 3,309,924 | 3/1967 | Kolin et al. | 73/194 EM |
| 3,373,608 | 3/1968 | Ketelsen | 73/194 EM |
| 3,589,186 | 6/1971 | Bourg et al. | 73/194 EM |

FOREIGN PATENTS OR APPLICATIONS

| 1,411,466 | 8/1965 | France | 73/194 EM |
| 1,521,859 | 3/1968 | France | 73/194 EM |

*Primary Examiner*—Charles A. Ruehl
*Attorney*—Michael Ebert

[57] ABSTRACT

A magnetic flowmeter for measuring volumetric fluid flow rates, the meter including a pair of electrodes disposed at diametrically opposed points in a non-magnetic pipe section through which the fluid to be measured is conducted. A non-homogeneous magnetic filed is established in the pipe section, the magnetic filed having a configuration whose magnetic lines of flux intersect the electric lines of flux extending between the electrodes substantially at right angles thereto to optimize the output signal developed at the electrodes.

4 Claims, 3 Drawing Figures

PATENTED SEP 5 1972  3,688,575

INVENTOR.
WILFRIED KIENE
BY
ATTORNEY

MAGNETIC FLOWMETER HAVING A NON-HOMOGENEOUS MAGNETIC FIELD

BACKGROUND OF THE INVENTION

This invention relates generally to magnetic flowmeters, and more particularly to a flowmeter having an electromagnetic coil adapted to produce a non-homogeneous magnetic field.

The magnetic flowmeter is adapted to measure volume rates of those fluids which present difficult handling problems, such as corrosive acids, sewage, slurries, detergents and the like. In a magnetic flowmeter, a magnetic field is generated which is so distributed that it is perpendicular to the longitudinal axis of the meter pipe through which the fluid to be measured flows, as well as to the axis of the meter electrodes.

Since the velocity of the fluid is directed along the longitudinal axis of the pipe, the voltage induced within the fluid will be perpendicular both to the velocity of this fluid and to the flux linkages of the magnetic field. Thus the metered fluid constitutes a series of fluid conductors moving through the magnetic field. The operating principle of a magnetic flowmeter is based upon Faraday's Law of Induction, which states that a voltage induced across any conductor as it moves at right angles through a magnetic field is proportional to the velocity of that conductor. Hence, the more rapid the rate of flow, the greater the instantaneous value of the voltage established at the electrodes.

In magnetic flowmeters, it has heretofore been the practice to develop a strong homogeneous magnetic field in order to produce a large output signal relative to noise arising in the flowmeter. However, applicant has found, contrary to the usual expectation, that with a homogeneous magnetic field, the resultant output signal for a given field strength does not attain an optimum value.

The reason for this drawback is that an optimum signal is obtainable only when the magnetic lines of flux intersecting the electric flux lines extending between the flowmeter electrodes are perpendicular thereto, and that this condition does not prevail with a homogeneous magnetic field.

The electric flux lines extending between the electrodes, with the exception of that flux line which corresponds to the common axis of the electrodes, are not straight, but are progressively more curved as one moves away from this axis. For all practical purposes, the electrodes in a magnetic flowmeter may be regarded as equivalent to spaced point electrodes and the curved lines of flux are similar to those established between point electrodes.

With a homogeneous magnetic field, the flux lines lie in parallel relation to each other. These magnetic lines, at their point of intersection with the electric lines, will, in many instances, deviate from a right-angle relationship thereto, particularly in the region adjacent the electrodes. As a consequence, the resultant induced signal at the electrodes falls short of its optimum value and the signal-to-noise ratio may be unfavorable. To overcome this drawback, it has heretofore been necessary to apply the signal to relatively complex amplifying systems adapted to enhance the signal relative to the noise components.

SUMMARY OF THE INVENTION

In view of the foregoing, it is the main object of this invention to provide a magnetic flowmeter having a coil arrangement adapted to generate a non-homogeneous field whose relationship to the electric field is such as to afford an optimum output signal.

More specifically, it is an object of the invention to provide a flowmeter of the above type in which the configuration of the non-homogeneous field is such as to cause the magnetic lines of flux perpendicularly to cross the electric field lines, particularly in the region adjacent the electrodes, whereby a signal is produced which reflects the total signal at all points of intersection, rather than only a portion thereof as in conventional flowmeters employing a homogeneous magnetic field.

Also an object of the invention is to provide a saddle-shaped electromagnetic coil for a flowmeter adapted to develop a non-homogeneous field.

A significant advantage of the invention is that it results in a significantly improved flowmeter signal-to-noise ratio and makes possible the use of less complex, low-cost signal amplifiers.

Briefly stated, these objects are attained in a magnetic flowmeter having a non-magnetic pipe section through which the fluid to be measured is conducted, the pipe section being provided at diametrically opposed points therein with electrodes. Associated with the pipe is an electromagnetic coil adapted to establish a non-homogeneous magnetic field therein substantially perpendicular to the longitudinal axis of the pipe and whose lines of flux intersecting the curved electric flux lines extending between the electrodes are at right angles thereto to provide an optimum signal output.

OUTLINE OF THE DRAWING

Figure 2:
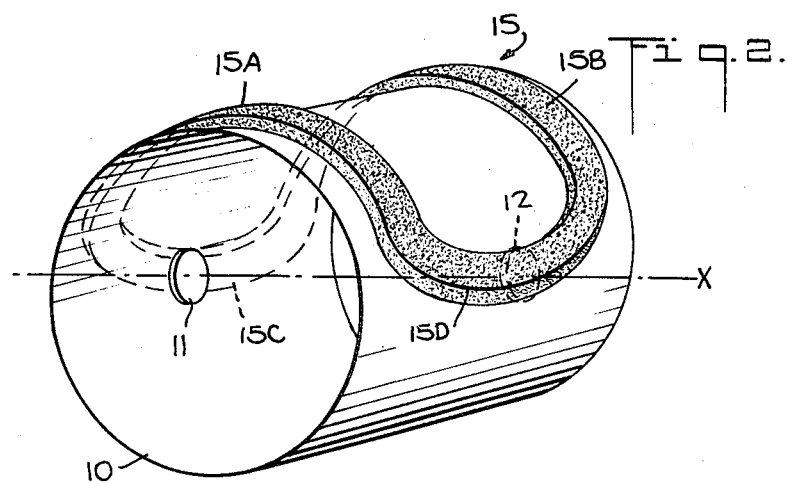
Figure 3:
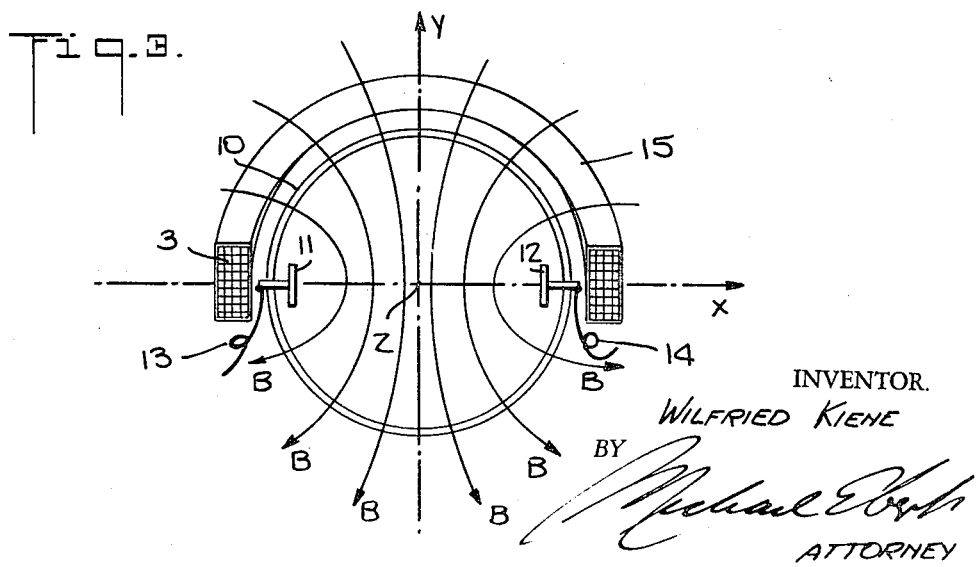

For a better understanding of the invention, as well as other objects and further features thereof, reference is made to the following detailed description to be read in conjunction with the accompanying drawing, wherein:

FIG. 1 schematically shows, in transverse section, the magnetic and electric lines of flux established in a magnetic flowmeter in accordance with the invention;

FIG. 2 is a perspective view of the flowmeter showing the shape of a preferred embodiment of an electromagnetic coil adapted to produce a non-homogeneous magnetic field in accordance with the invention; and FIG. 3 is a transverse section taken through FIG. 2.

DESCRIPTION OF THE INVENTION

Referring now to the drawing, there is shown a magnetic flowmeter in accordance with the invention, the meter including a pipe section 10 of circular cross section. Pipe section 10 is made of non-magnetic material such as stainless steel or other suitable material, and it may include an insulating liner (not shown) of Teflon or material which is non-reactive with the fluids being measured.

Two small disc-shaped electrodes 11 and 12 are mounted at diametrically opposed points in the central portion of the pipe section. The signal established between the electrodes is picked up by suitable leads 13 and 14 and applied to an external amplifying circuit.

In the pipe section, the fluid to be measured flows in the direction of the longitudinal axis Z which is perpendicular to the axis X extending between and common to electrodes 11 and 12. Axes X and Z are mutually perpendicular to the axis Y bisecting the pipe section.

The line of flux of the electric field E running between electrodes 11 and 12 along axis X common thereto is a straight line, but the lines above and below axis X are curved, the curvature becoming progressively greater and tending to conform to the curvature of the pipe as one moves toward the circular wall of the pipe section. Consequently, the curved flux lines E in the region adjacent the electrodes have increasing angles with respect to the X axis.

As pointed out previously, it has heretofore been the practice to establish a homogeneous magnetic field in the pipe section. In order to illustrate the disadvantages of a homogeneous field, FIG. 1 shows such a field which is represented by dashed lines HB in parallel relation.

It will be seen that with a homogeneous field, the magnetic lines of flux HB, particularly in the region adjacent the electrodes, are at right angles to the electric lines of flux E only with respect to straight line E corresponding with axis X, and that at all other points of intersection, the relationship departs progressively from the perpendicular, with a resultant loss in signal strength.

In order to maximize signal strength, an electromagnetic coil 15 is provided which is shaped in the manner shown in FIGS. 2 and 3 to establish a non-homogeneous field whose lines of flux B are curved away from the Y axis save for that line corresponding to the axis Y, the degree of curvature increasing progressively as one moves toward electrodes 11 and 12. Thus the electric and magnetic lines of flux E and B form a system of coordinates with respect to the X and Y axes. The coordinate pattern on the side of electrode 11 is a mirror image of the coordinate pattern on the side of electrode 12.

Thus the magnetic lines of flux produced by the non-homogeneous magnetic field intersect at right angles to the electric lines of flux extending between the electrodes, this being true even in the region adjacent the electrodes where the angle of the electric flux lines with respect to the X axis is greatest.

In order to accomplish this result, coil 15 has a saddle-shaped configuration which, as will be seen in FIG. 3, is symmetrical with respect to the horizontal plane passing through common electrode axis X. The saddle-shaped coil is formed by yoke sections 15A and 15B which are joined together by connecting sections 15C and 15D. The yoke sections 15A and 15B, respectively, overlie the upstream and downstream portions of pipe section 10 on either side of the X axis, whereas the connecting sections 15C and 15D pass through the X axis.

While there has been shown and described a preferred embodiment of magnetic flowmeter having a non-homogeneous magnetic field in accordance with the invention, it will be understood that many changes and modifications may be made therein without, however, departing from the essential spirit thereof.

I claim:

1. A magnetic flowmeter having a favorable signal-to-noise ratio, said flowmeter comprising:
    A. a non-magnetic pipe section,
    B. a pair of electrodes mounted on said pipe section at diametrically opposed points thereon along a common axis which is perpendicular both to the longitudinal flow axis of the pipe section and to an axis bisecting the pipe section, said electrodes being equivalent to point electrodes such that when a voltage is applied thereto, an electric field is produced therebetween whose lines of flux above and below said common axis are curved, the curvature becoming greater as one moves away from said common axis, and
    C. an electromagnetic coil mounted in said pipe section to produce a non-homogenous magnetic field whose magnetic lines of flux are substantially perpendicular to the electric lines of flux extending between the electrodes.

2. A flowmeter as set forth in claim 1, wherein said non-homogeneous field produces a system of coordinates with respect to said common axis and said bisecting axis, whose pattern of intersecting magnetic and electric lines on the side including one of said electrodes is a mirror image of the pattern at the side including the other electrode.

3. A flowmeter as set forth in claim 2, wherein said non-homogeneous field is produced by a coil having a saddle shape.

4. A flowmeter as set forth in claim 3, wherein said saddle-shaped coil is constituted by two yoke sections joined together by two connecting sections, the yoke sections overlying said pipe section on either side of said common axis, said connecting section passing through said common axis.

* * * * *